(12) United States Patent
Avdjian

(10) Patent No.: US 9,964,219 B2
(45) Date of Patent: *May 8, 2018

(54) BALL VALVE

(71) Applicant: Cameron International Corporation, Houston, TX (US)

(72) Inventor: Christophe Avdjian, Meyreuil (FR)

(73) Assignee: Cameron International Corporation, Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/396,776

(22) Filed: Jan. 2, 2017

(65) Prior Publication Data

US 2017/0138487 A1 May 18, 2017

Related U.S. Application Data

(63) Continuation of application No. 14/555,625, filed on Nov. 27, 2014, now Pat. No. 9,534,696, which is a continuation of application No. 13/975,319, filed on Aug. 24, 2013, now Pat. No. 8,960,642, which is a continuation of application No. 13/315,233, filed on Dec. 8, 2011, now Pat. No. 8,727,314.

(30) Foreign Application Priority Data

Dec. 8, 2010 (EP) ..................................... 10306377

(51) Int. Cl.
*F16K 5/00* (2006.01)
*F16K 5/20* (2006.01)
*F16K 5/06* (2006.01)
*F16K 25/00* (2006.01)

(52) U.S. Cl.
CPC .......... *F16K 5/0684* (2013.01); *F16K 5/0689* (2013.01); *F16K 5/204* (2013.01)

(58) Field of Classification Search
CPC .......... F16K 5/201; F16K 5/204; F16K 5/205; F16K 5/0689; F16K 5/0684
See application file for complete search history.

(56) References Cited

U.S. PATENT DOCUMENTS

| 3,195,857 A | 7/1965 | Shafer |
| 4,257,574 A | 3/1981 | Chacour |

(Continued)

FOREIGN PATENT DOCUMENTS

| CN | 1142027 A | 2/1997 |
| CN | 2679436 Y | 2/2005 |

(Continued)

OTHER PUBLICATIONS

European Search Report for EP Application No. 10306377.2 dated Jun. 6, 2011.

(Continued)

*Primary Examiner* — Craig Schneider
*Assistant Examiner* — Kevin Barss
(74) *Attorney, Agent, or Firm* — Fletcher Yoder, P.C.

(57) ABSTRACT

The disclosed embodiments include ball valves having integrated seats. The integrated seats are included in a ball body assembly of a valve body. The ball body assembly may rotate with respect to the valve body to open or close the valve. The integrated seats may contact walls of a bore to sealingly close the valve.

22 Claims, 4 Drawing Sheets

(56) References Cited

U.S. PATENT DOCUMENTS

| | | | |
|---|---|---|---|
| 4,385,747 A | 5/1983 | Renaud et al. | |
| 5,332,193 A | 7/1994 | Giacomini | |
| 5,417,405 A | 5/1995 | Stephan et al. | |
| 5,482,253 A | 1/1996 | Klyde | |
| 5,577,708 A | 11/1996 | Pfannenschmidt | |
| 5,632,294 A | 5/1997 | Benton | |
| 6,974,121 B2 | 12/2005 | Koester et al. | |
| 7,699,074 B2 | 4/2010 | Lomax | |
| 8,727,314 B2 * | 5/2014 | Avdjian | F16K 5/0684 251/180 |
| 8,960,642 B2 * | 2/2015 | Avdjian | F16K 5/0684 251/180 |
| 9,534,696 B2 * | 1/2017 | Avdjian | F16K 5/0684 |
| 2006/0048825 A1 | 3/2006 | Lomax | |

FOREIGN PATENT DOCUMENTS

| | | |
|---|---|---|
| CN | 201028039 Y | 2/2008 |
| CN | 201391628 Y | 1/2010 |
| DE | 1122788 | 1/1962 |
| FR | 1375004 | 10/1964 |
| GB | 945508 | 1/1964 |
| JP | 57144358 | 9/1982 |

OTHER PUBLICATIONS

CN First Office Action and English Summary; Application No. CN 201510259289.3; dated Nov. 16, 2016; 8 pages.

Chinese Office Action for CN Application No. 201510259613.1 dated Mar. 3, 2017; 11 Pages.

Chinese Third Office Action for CN Application No. 201510259613.1 dated Nov. 16, 2017; 16 Pages.

* cited by examiner

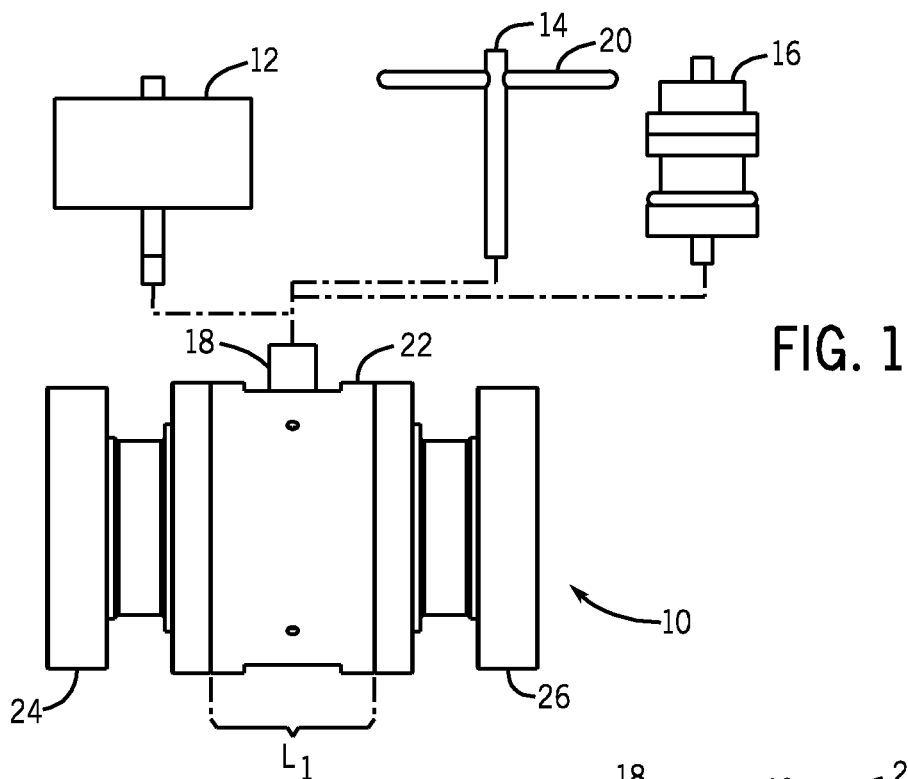
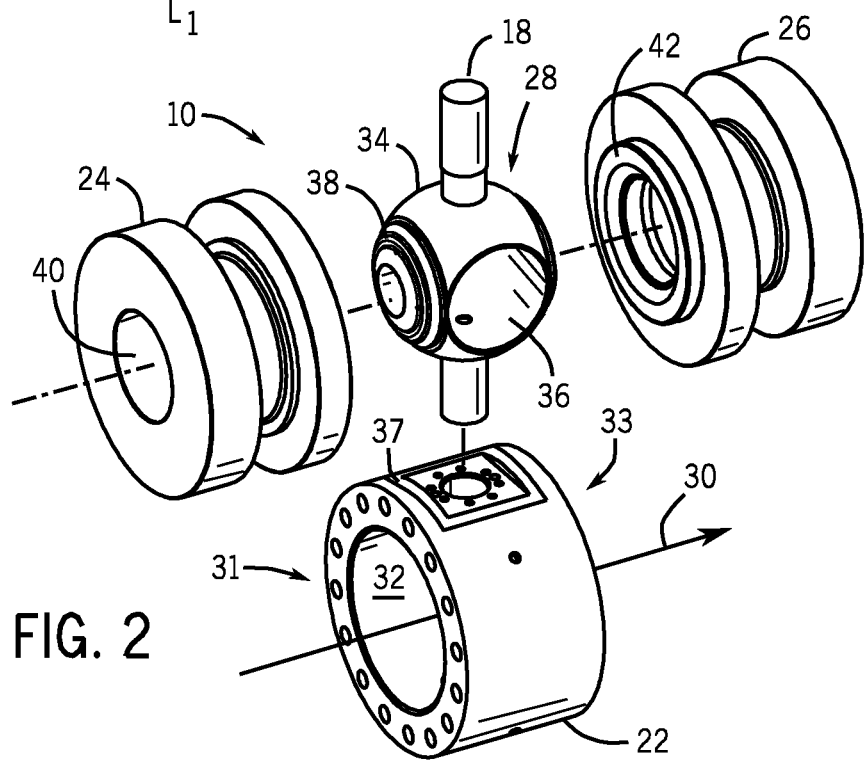

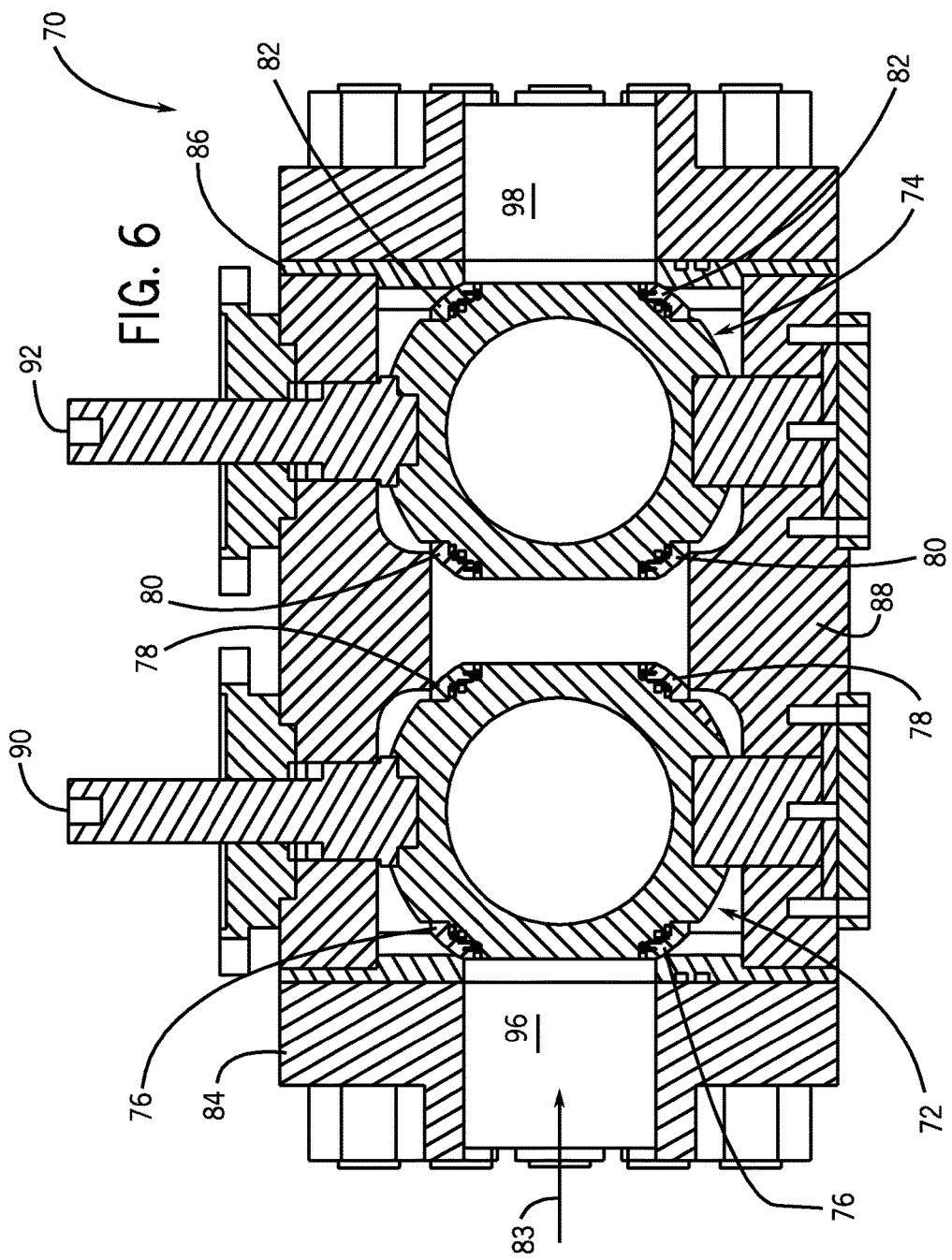

BALL VALVE

CROSS REFERENCE TO RELATED APPLICATIONS

This application is a continuation of U.S. Non-Provisional patent application Ser. No. 14/555,625, entitled "Ball Valve", filed on Nov. 27, 2014, which is herein incorporated by reference in its entirety, which is a continuation of U.S. Non-Provisional patent application Ser. No. 13/975,319, entitled "Ball Valve", filed on Aug. 24, 2013, now U.S. Pat. No. 8,960,642, issued on Feb. 24, 2015, which is herein incorporated by reference in its entirety, which is a continuation of U.S. Non-Provisional patent application Ser. No. 13/315,233, entitled "Ball Valve", filed on Dec. 8, 2011, now U.S. Pat. No. 8,727,314, issued on May 20, 2014, which is herein incorporated by reference in its entirety, and which claims priority to and benefit of EP Patent Application No. 10306377.2, entitled "BALL VALVE", filed Dec. 8, 2010, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves are capable of controlling a flow through a conduit by using a sphere with a port or hole typically centered in the sphere. The valve is opened by rotating the sphere so as to position the port or hole in line with both ends of the valve. A flow may thus move from a first end of the valve, traverse the port or hole, and continue through the second end of the valve. Likewise, the valve is closed by rotating the sphere so as to position the port or hole perpendicular to the ends of the valve. Unfortunately, the sphere may deform over time under loading conditions, resulting in leakage or improper seals.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is a perspective view of a ball valve and valve actuators in accordance with an embodiment of the disclosure;

FIG. 2 is an exploded perspective side view of a trunnion ball valve, including flanged valve ends, a valve body, and a ball body assembly in accordance with an embodiment of the disclosure;

FIG. 6 is a cross-sectional side view of an embodiment of a double block and bleed valve.

DETAILED DESCRIPTION OF SPECIFIC EMBODIMENTS

Figure 3:
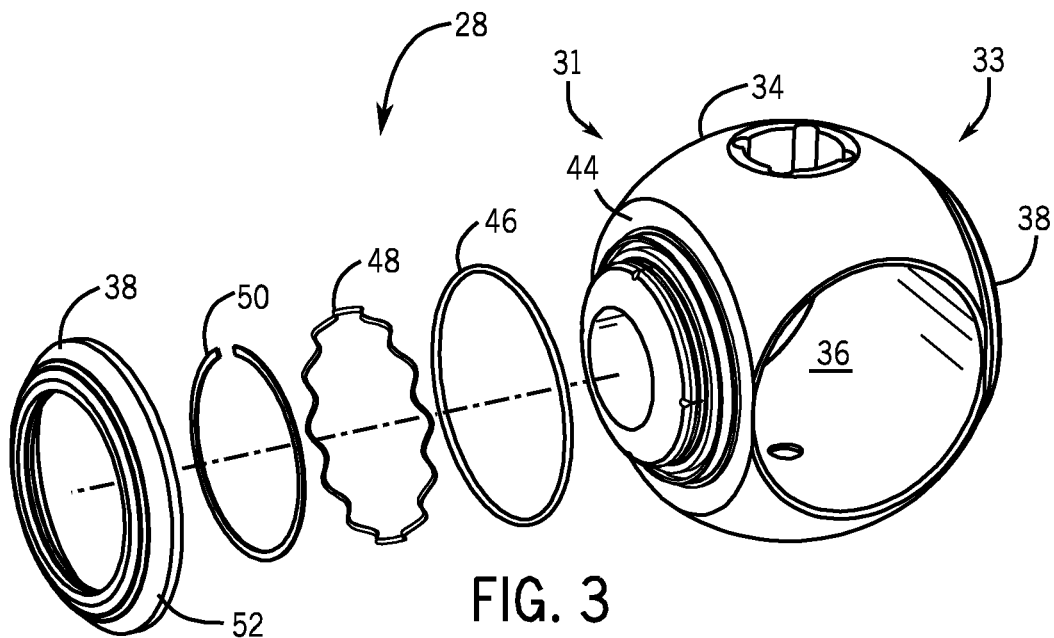
FIG. 3 is an exploded perspective side-view of components of a ball valve in accordance with an embodiment of the disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

The disclosed embodiments include a ball valve, such as a trunnion ball valve, having a valve seat integrated in the ball body capable of reducing or eliminating leakage through the bore-to-seat interface. The valve seat is disposed in the ball body and includes a geometry and "piston effect" techniques suitable for sealingly maintaining contact with the bore, even in situations where the ball body is not completely spherical. Additionally, a substantial portion of the ball body may be left "raw" or unfinished with only the seal and trim areas machined, thus saving time and costs of manufacture. The ball valve may be used with piping of different sizes (e.g., approximately between ½ in. to 30 in., 15 in. to 45 in., 35 in. to 80 in. diameters) and different flow pressures (e.g., approximately between 5-50,000 PSI). Further, the ball valve is capable of reducing actuation torque due to a reduced piston effect. Additionally, the integrated seat techniques disclosed herein enable a compact ball valve design suitable for improved installation and maintenance. Indeed, the compact ball valve design eliminates the need for the use of special tools and techniques, such as retracting seat tools and/or sophisticated multiple sealing elements used when servicing traditional ball valves.

FIG. 1 is a perspective side view of embodiments of a trunnion ball valve 10, a paddle actuator 12, a manual actuator 14, and a hydraulic actuator 16. A trunnion or stem 18 of the trunnion ball valve 10 may be connected to any of the actuators 12, 14, or 16 and used to open and close the ball valve by applying a torque. For example, the paddle actuator 12 may be connected for subsea applications and used by a remotely operated underwater vehicle (ROV). The ROV may rotate the paddle and thus open or close the ball valve 10. Likewise, the manual actuator 14 may be connected and used for above-ground applications. A human operator may turn the wheel 20 of the manual actuator, thus opening or closing the ball valve 10. Further, the hydraulic actuator 16 may be used for remote valve activation. Accordingly, the ball valve 10 may be remotely opened or closed by remote hydraulic (or electric) actuation. Actuation torque for the ball valve 10 may be reduced by using certain embodiments disclosed herein, such as ball body integrated seats, while enabling the use of higher working pressures.

In the illustrated embodiment, the trunnion ball valve 10 includes a valve body 22 having a length L1. The valve body 22 may be attached to a set of flanged valve ends 24 and 26, as illustrated. In certain applications, such as applications specifying quick removal and replacement of a valve, the flanged valve ends 24 and 26 may be used to securely connect the valve body 22 to conduit or pipe. The flanged valve ends 24 and 26 enable easy installation and removal of the ball valve 10 from a conduit such as a flanged pipe. The ball valve 10 may be installed, for example, by using gaskets and a plurality of nuts and bolts suitable for securing the flanged valve ends 24 and 26 to the conduit. In other applications, such as subsea manifold applications, it may be desirable to fixedly couple the ball valve 10 to the conduit, by using welds. Welding the ball valve 10 to the conduit may reduce weight, create stronger connections, and define a substantially leak-proof passage. Accordingly, the flanged valve ends 24 and 26 may be replaced with a set of weldable valve ends (not shown). Indeed, the use of the certain embodiments described herein, such as integrated seats disposed in a ball body, allow for the use of welding heat without damage to the valve's component parts. The weldable valve ends are capable of withstanding the heat generated during welding and may be capable of meeting ISO 14313 (pipeline valves) and ISO 14723 (subsea pipeline valves) specifications. Indeed, the trunnion valve 10 may be capable of meeting a variety of valve-related ISO, ANSI, API, ASME, and/or NACE specifications, including subsea specifications. Further, it is to be understood that other valve ends may be used, including combinations of flanged valve ends, weldable valve ends, and/or hub valve ends. That is, the valve body 22 may include a flange valve end 24 at one end of the valve body 22 and a hub valve end at the opposite end.

FIG. 2 depicts an exploded perspective view of the trunnion ball valve 10 of FIG. 1, illustrating details of the flanged valve ends 24 and 26, the valve body 22, and a ball body assembly 28. The ball body assembly 28 is configured to enable a flow 30 in an axial direction. The flow 30 may be driven, for example, by a pump, a compressor, a well pressure, or any other device capable of creating a movement of a fluid through a fluid passage 32 defined by the internal walls of the valve body 22. In the depicted embodiment, the ball body assembly 28 includes a ball body 34 having a passage 36, e.g., an approximately circular opening 36. The ball body assembly 28 may be disposed inside of the valve body 22 and rotated relative to the valve body 22 so as to open and close the fluid passage 32. Indeed, the rotation of the ball body assembly 28 results in an equivalent rotation of the circular opening 36, thus allowing the flow 30 to enter inwardly into the valve body 22 through one side 31 of the valve body 22, traverse the opening 36 and continue exiting outwardly through the opposite side 33 of the valve body 22. The flow 30 may enter through either of the two sides 31, 33 of the valve body 22 and exit through the opposite side.

In the depicted embodiment, the trunnion ball valve 10 includes the flanged valve ends 24 and 26, which may be secured concentrically or co-axially with respect to the valve body 22 as shown in FIG. 1. Accordingly, the flow 30 may enter the flanged valve end 24 (or 26) into the valve body 22, traverse through the opening 36, and exit through the flange 26 (or 24). In certain embodiments, the flange valve ends 24 and 26 may include contact surfaces or walls suitable for engaging a seat 38, such as a toroidal or annular seat 38. The annular seat 38 is integrated into the ball body assembly 28 and includes, in certain embodiments, "piston effect" features that enable a more secure sealing of the ball body assembly 28, even in situations where the ball body 34 may not be completely spherical. For example, the piston effect features may include one or more chambers suitable for using the fluid flow 30 to bias the annular seat 38 against the direction of flow. Indeed, the seat 38 allows for the ball body 34 to undergo certain deformation, while the seat 38 maintains a suitable seal against the flow 30 of fluid.

The seat 38 enables operation of the valve 10 at higher flow pressures, such as pressures approximately between 5-50,000 PSI, and piping sizes of approximately between ½ in. to 30 in., 15 in. to 45 in., 35 in. to 80 in. Such high pressure, high flow conditions may result in ball body deformations with a corresponding seal leakage in traditional ball valves that do not incorporate the integrated seat 38. This leakage is substantially reduced or eliminated by using the integrated seat 38. Indeed, the embodiments disclosed herein enable a substantial improvement in maintaining a suitable seal even in circumstances where the ball body 34 experiences higher pressures and/or higher flow rates, because most resulting deformations may occur near the stem 18 area of the ball body assembly 28, which is independent from the integrated seat 38.

In certain embodiments, the valve body 22 may allow for improved maintenance and/or manufacturing access by including a top entry opening 37 suitable for inserting the ball body assembly 28 into the valve body 22. Traditionally, special tools and/or multiple sealing elements may have been needed to remove and replace the ball body 34, for example, because of spring-loaded seats disposed inside a bore 40 of the valve end 24 and on a bore 42 of the valve end 26. Such bore-mounted seats may now be replaced with the integrated seats 38 on the ball body assembly 28. Accordingly, the ball body assembly 28 may be removed and/or inserted in a ball open position into the valve body 22 without the need for special tools and/or sealing elements. Indeed, the use of the integrated seats 38 on the ball body assembly 28, as described in more detail below with respect to FIG. 3, enables a more easily maintainable and compact ball valve 10.

FIG. 3 is an exploded perspective side view of an embodiment of the ball body assembly 28. In the depicted embodiment, the ball body assembly 28, includes the ball body 34 having grooves 44 (e.g., annular grooves) on a first side 31 of the ball body 34. The grooves 44 may be milled or machined to form smooth surfaces. The grooves 44 are configured to engage an seal 46, a spring 48, a seat ring or washer 50, and the annular seat 38. A second annular seat 38, with corresponding grooves 44, seal 46, spring 48, and seat ring 50, is disposed on a second side 33 of the ball body 34 opposite from the seat 38 on the first side 31. The use of the integrated seats 38 facilitates an improved seal in a more compact ball valve 10 suitable for enabling high pressure flows.

In certain embodiments, manufacturing time and cost may be reduced by leaving most of the ball body 34 unfinished or "raw." That is, the ball body 34 may be cast, but only certain areas of the ball body, such as the areas near or on the grooves 44, may be further treated through machining, milling, and/or the application of a coating. The remainder of the ball body 34 may not come into sealing contact with other valve 10 components, and thus, all ball body areas may not require further treatment and/or coating. It is to be understood that, in other embodiments, other areas of the ball body 34 may receive further treatment, including milling, machining, and/or coating.

In the depicted embodiment, the seal 46 is disposed first onto the grooves 44. The seal 46 may enable an improved seal between the seat 38 and the ball body 34. Accordingly, the seal 46 may be an elastomeric seal, a plastic seal, a graphite seal, or manufactured out of any other suitable material. The spring 48 may then be disposed onto the grooves 44. The spring 48 enables a compressive force between the seat 38 and the ball body 34 that may "push" the seat 38 outwardly away from the ball body 34, as described in more detail below with respect to FIG. 4. The spring 48 may thus aid in an enhanced contact between outwardly-facing walls 52 of the seat 38 and certain walls inside the bores 40 and 42 of the ends 24 and 26. In certain embodiments, the outwardly-facing walls 52 may be coated so as to reduce contact friction and to aid in corrosion resistance. For example, the outwardly-facing walls 52 may be coated with carbide-based coatings, such as a tungsten carbide coating (TCC), a boron carbide coating, or any other suitable coating. The seat ring 50 may be disposed between the seat 38 and the spring 48. The seat ring 50 may be used to limit seat 38 displacement and to maintain spring 48 compressive force. The seat ring 50 may also be provided in different thicknesses and may be used to fine tune the ball valve 10 for different operational environments.

Thicker seat rings 50 may allow for an increased distance of the seat 38 outwardly from the ball body 34, thus increasing the contact surface and/or contact force between the seat 38 and certain walls of the valve ends 24 and 26. Similarly, slimmer seat rings 50 may allow for a decreased distance of the seat 38 outwardly from the ball body 34, thus decreasing the contact surface and/or contact force between the seat 38 and certain walls of the valve end 24. Likewise, the spring 48 may be provided with different spring forces suitable for increasing or decreasing the outward bias of the seat 38 due to the spring 48. In certain embodiments, the spring 48 force may be used only to initiate a pressure build up, and the spring 48 force may be a constant value for a given size of valve 10. Accordingly, the ball valve 10 may be fine tuned to provide sealing forces suitable for numerous operational environments, such as low pressure environments, medium pressure environments, and high pressure environments. In certain embodiments, the seat 38 may include "piston effect" features, such as described in more detail below with respect to FIG. 4. The piston effect features may be configured to enable operation of the ball valve 10 with sufficient sealing in a variety of operational environments. Indeed, the "piston effect" could be tailored to operate in high pressure applications.

Figure 4:
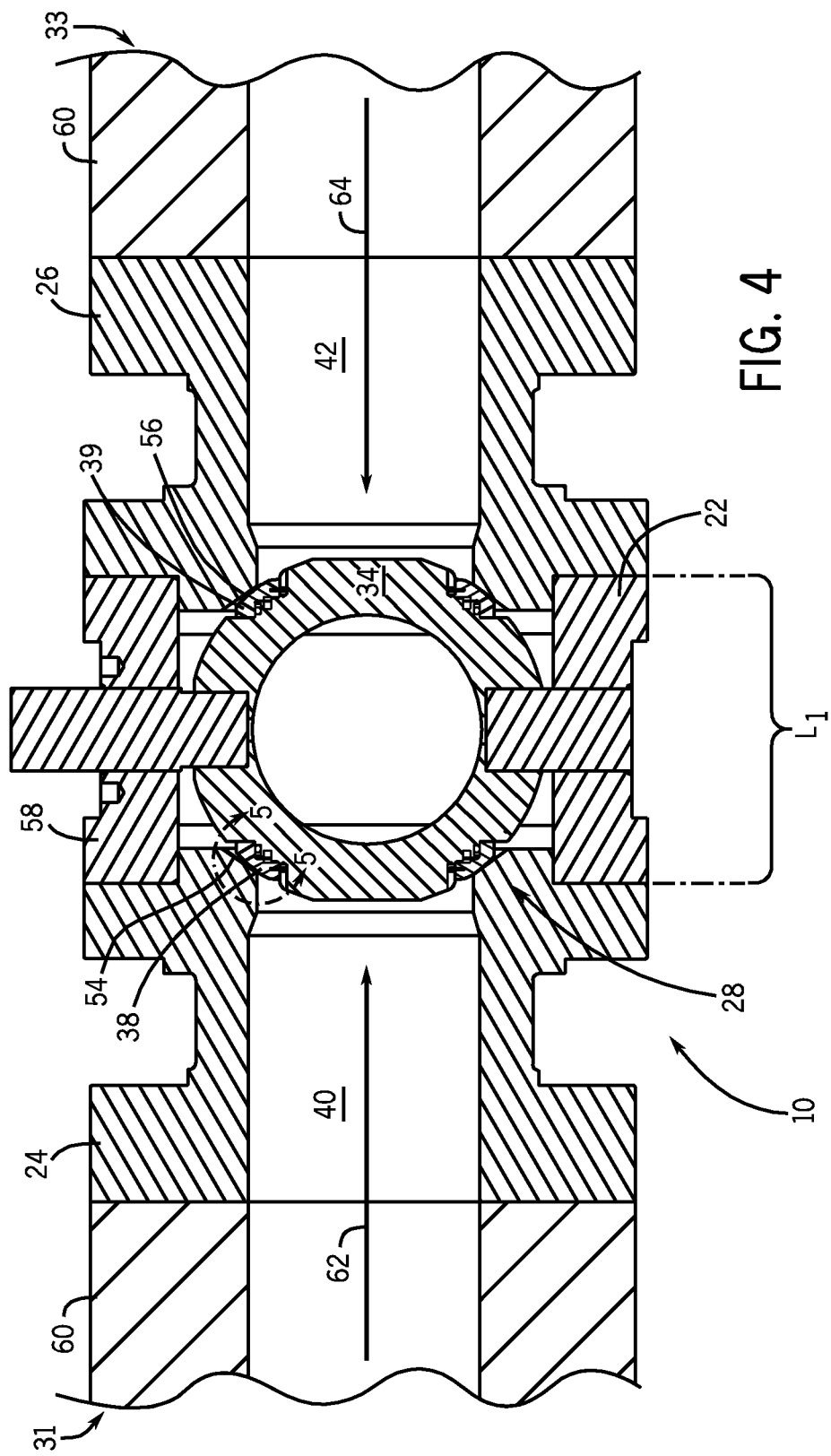
FIG. 4 is a cross-sectional view of a ball valve in accordance with an embodiment of the disclosure.

FIG. 4 is a cross-sectional view of an embodiment of the trunnion ball valve 10 in a fully closed position. As illustrated, the annular integrated seat 38 on the first side 31 is spring biased against a wall 54, and the annular integrated seat 38 on the second side 33 is spring biased against a wall 56. In certain embodiments, the annular seats 38 enable a metal-to-metal contact with the walls 54 and 56. The metal-to-metal seating may be useful in applications, such as high temperature applications and/or corrosive fluid applications. Accordingly, the annular seats 38 and the walls 54 and 56 may be manufactured out of a metal and/or a metal alloy, such as inconel, stainless steel, cro-moly, steel, and so forth. Additionally, the seats 38 and/or the walls 54 and 56 may be coated (e.g., TCC coated) to reduce friction and improve resistance to corrosion.

In other embodiments, the seats 38 and 39 may enable a "soft seal," such as an elastomer-to-metal or elastomer-to-elastomer contact. Accordingly, the seats 38 and 39, and/or the walls 54 and 56, may include elastomer inserts or may be manufactured out of elastomer materials such as thermoplastics, synthetic rubber, polymers, or other non metallic sealing materials. Such "soft seal" embodiments, for example, may aid in preventing electrolysis between the contact points should the valve be left in a closed position for prolonged periods of time. It is to be understood that, in other embodiments, the seats 38 and 39 may contact a wall of the valve body 22 instead of the walls 54 and 56 of the valve ends 24 and 26. Indeed, walls of the valve body 22 may be used to seal the fluid passage 32.

The use of the annular seats 38 results in a more compact ball valve 10. For example, the ball body 34 may be substantially the same length L1 as the ball body assembly 28. Additionally, the valve ends 24 and 26 may not require the use of a bore seat. The bore seat typically would require additional space because it is separate from the ball body 34. Instead, the valve ends 24 and 26 may directly contact the integrated seats 38 on the ball body 34. Such an embodiment results in a more compact ball valve 10 having improved sealing capabilities. The valve 10 may also include a top entry component 58 disposed in the valve body 22, suitable for in-line maintenance. More specifically, the top entry component 58 may be removed, while the remaining components of the valve 10 remain coupled to a conduit 60 (i.e., in-line with the conduit 60). When the top entry component 58 is removed, the ball body assembly 28 components can be inspected, and a maintenance may be performed. For example, components of the ball valve 10 may be replaced, including the seats 38.

Embodiments of the trunnion ball valve 10 may also include "piston effect" features in which the flow pressure aids in maintaining a secure sealing contact between the seats 38 and the walls 54 and 56. In a single piston effect embodiment, the trunnion ball valve 10 is designed to use the fluid pressure to further aid in sealing the seat 38 on the first side 31 and/or the second side 33. For example, a fluid flow 62 may enter the bore 40 and impinge upon the ball body 34. The fluid flow 62 may result in a pressure against the ball body 34. Such a pressure may move the ball body 34 in a downstream fluid 62 direction, biasing the downstream seat 38 more firmly against the wall 56 of the valve end 26. Indeed, increasing the fluid flow pressure may correspondingly increase the piston effect pressure against the ball body 34, thus resulting in a more secure seal of the seat 38. Likewise, a fluid flow 64 may enter the bore 42 and impinge upon the ball body 34, resulting in a fluid pressure against the ball body 34. The pressure may move the ball body 34 in a downstream fluid 64 direction, biasing the downstream seat 38 more firmly against the wall 54 of the valve end 24.

Figure 5:
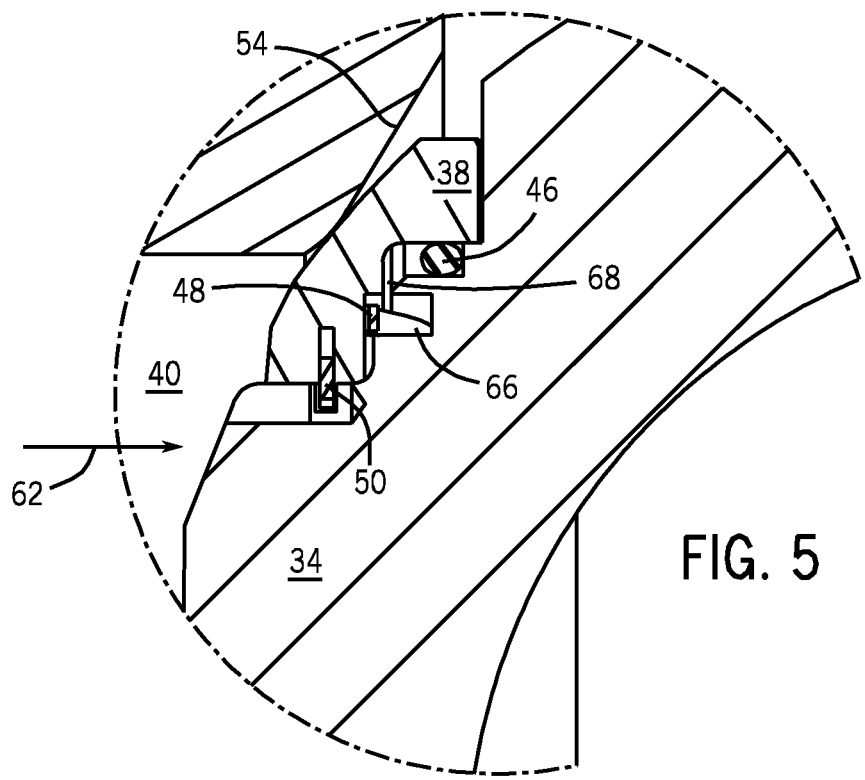
FIG. 5 is a partial cross-sectional view of an annular integrated seat in accordance with an embodiment of the disclosure.

FIG. 5 is a partial cross-sectional view of an embodiment of the integrated seat 38 depicted in FIG. 4 taken within line 5-5. In a double piston effect embodiment, the trunnion ball valve 10 is designed to use fluid pressure to further aid in sealing both of the two annular seats 38. As mentioned above with respect to FIG. 4, the fluid flow 62 entering the bore 40 may result in a pressure suitable for biasing the seat 38 more firmly against the wall 56. This same fluid flow 62 may also result in a pressure suitable for biasing the seat 38 more firmly against the wall 54 of the valve end 24. Accordingly, the fluid flow 62 may enter the bore 40 and flow into a chamber 66 of the ball body 34 and a chamber 68 of the integrated seat 38. The fluid pressure resulting from the fluid flow 62 entering the chambers 66 and 68 may move or push the seat 38 outwardly towards the wall 54. Indeed, further increase in fluid pressure may result in a corresponding increase in the force of the contact between the upstream seat 38 and the wall 54. As the seat 38 moves, the seal 46 may aid in maintaining a secure seal downstream of the fluid flow 62. Additionally, the spring 48 may also aid in moving the seat 38 outwardly from the ball body 34. Further, because the seat 38 is independent of the ball body 34, the seal or contact between the seat 38 and the wall 54 may be maintained even if the ball body 34 moves downstream of the fluid 62 and/or undergoes deformation. Indeed, the ball body 34 may not need to be approximately spherical shape in order for the ball valve 10 to maintain a secure seal. Accordingly, the double piston effect is capable of using the fluid 62 pressure to aid in sealing the seats 38 on both sides 31 and 33.

FIG. 6 is a cross-sectional view of an embodiment of a multiple ball assembly valve, such as a double block and bleed valve 70, which includes two ball body assemblies 72 and 74. More specifically, the ball body assembly 72 includes annular integrated seats 76 and 78, while the ball body assembly 74 includes annular integrated seats 80 and 82. Indeed, the integrated seats 76, 78, 80, and 82 allow for the manufacturing of compact valves having two (or more) ball body assemblies 72 and 74. In the depicted embodiment, the use of the two ball body assemblies 72 and 74 provides for dual isolation of a flow. For example, the first ball body assembly 72 may be used to stop a fluid flow 83, while maintenance activities are carried out in the second ball body assembly 74. Indeed, each of the ball body assemblies 72 and 74 is capable of isolating a fluid flow from the other assembly. The depicted double block and bleed valve 70 may be made more compact because the integrated seats 76, 78, 80, and 82 are designed to operate within grooves in the ball assemblies 72 and 74, and thus, the valve 70 may not require seats in the valve ends 84 and 86. Accordingly, space that would have been used to add seats on the valve ends 84 and 86 may be eliminated, resulting in a more compact double block and bleed valve 70. The ball body assemblies 72 and 74, including integrated seats 76, 78, 80, and 82, may be functionally similar to the single ball assembly 28 having the integrated seats 38 but may have different sizes and or shapes to more suitably operate in a valve body 88.

More specifically, a stem 90 may be used to actuate the ball body assembly 72 by rotating the ball body assembly 72 with respect to the valve body 88. Likewise, a stem 92 may be used to actuate the ball body assembly 74 by rotating the ball body assembly 74 with respect to the valve body 88. In a closed valve position, the integrated seat 76 contacts walls of a bore 96 of the valve end 84. Additionally, in a closed valve position, the integrated seat 78 contacts walls of the valve body 88. Likewise, in a closed valve position, the integrated seat 80 contacts walls of the valve body 88. Additionally, in a closed valve position, the integrated seat 82 contacts walls of a bore 98 of the valve end 86. Indeed, the disclosed embodiments enable a dual flow isolation suitable for performing in-line valve maintenance of either of the ball body assemblies 72 or 74, while the other assembly is used to stop a flow.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a valve assembly, comprising:
a valve body having a fluid passage;
a body assembly disposed in the valve body along the fluid passage, wherein the body assembly comprises:
a body having a first groove;
a first seat disposed in the first groove; and
a first spring disposed in the first groove, wherein the first spring is configured to bias the first seat away from the body toward a first seating portion of the valve body to form a seal against fluid flow, and the first seating portion is disposed about the fluid passage.

2. The system of claim 1, comprising a first seal disposed in the first groove separate from the first spring.

3. The system of claim 1, wherein the first spring comprises a plurality of curved portions.

4. The system of claim 1, wherein the first spring has a thickness that extends into at least a portion of a depth of the first groove, and the first spring has one or more spaces in the thickness of the first spring.

5. The system of claim 1, wherein the first seat comprises a first annular seat having a first central opening.

6. The system of claim 5, wherein the first groove comprises a first annular groove disposed about a first portion of the body, and the first annular seat is disposed in the first annular groove with the first central opening disposed about the first portion of the body.

7. The system of claim 6, wherein the first spring is disposed in the first annular groove with a central opening disposed about the first portion of the body.

8. The system of claim 1, wherein the first spring is configured to move the first seat away from the body over a range of movement.

9. The system of claim 8, wherein the valve assembly is configured to limit displacement of the first seat.

10. The system of claim 1, wherein the first seat comprises an L-shaped cross-section.

11. The system of claim 1, wherein the first groove and the first seat are oriented substantially perpendicular to an axis of the fluid passage.

12. The system of claim 1, wherein the body assembly is configured to rotate about a rotational axis between an open position and a closed position relative to the fluid passage.

13. The system of claim 12, wherein the body of the body assembly comprises an opening, the body assembly is configured to position the opening into the fluid passage in the open position, and the body assembly is configured to position the opening out of the fluid passage in the closed position.

14. The system of claim 1, wherein the body of the body assembly is at least partially ball shaped.

15. The system of claim 1, wherein the body of the body assembly is substantially ball shaped between opposite first and second stem portions.

16. The system of claim 1, wherein the body assembly comprises:
a second seat disposed in a second groove in the body; and
a second spring disposed in the second groove, wherein the second spring is configured to bias the second seat away from the body toward a second seating portion of the valve body.

17. The system of claim 1, comprising a first fluid chamber disposed in the first groove, wherein the first fluid chamber is configured to use fluid pressure to bias the first seat away from the body toward the first seating portion of the valve body.

18. The system of claim 1, wherein the seal comprises an annular sealing interface between the first seating portion and the first seat, and the annular sealing interface extends about an axis of the fluid passage.

19. A system, comprising:
- a body assembly configured to mount in a valve body along a fluid passage, wherein the body assembly comprises:
  - a body having a first groove;
  - a first seat disposed in the first groove; and
  - a first spring disposed in the first groove, wherein the first spring is configured to bias the first seat away from the body toward a first seating portion of the valve body to form a seal against fluid flow, and the first seating portion is disposed about the fluid passage.

20. The system of claim 19, wherein the body of the body assembly comprises an opening, and the body of the body assembly is at least partially ball shaped.

21. The system of claim 19, wherein the first spring is not configured to seal.

22. A method, comprising:
- seating a body assembly in a valve body along a fluid passage with a first seat disposed in a first groove of a body of the body assembly; and
- biasing the first seat away from the body toward a first seating portion of the valve body with a first spring disposed in the first groove to form a seal against fluid flow, wherein the first seating portion is disposed about the fluid passage.

* * * * *